(12) United States Patent
Takeuchi et al.

(10) Patent No.: US 8,983,810 B2
(45) Date of Patent: Mar. 17, 2015

(54) APPARATUS, METHOD AND PROGRAM FOR MONITORING NUCLEAR THERMAL HYDRAULIC STABILITY OF NUCLEAR REACTOR

(75) Inventors: Yutaka Takeuchi, Tochigi (JP); Hiroyuki Takeuchi, Chuo-Ku (JP); Kazuki Yano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 13/542,911

(22) Filed: Jul. 6, 2012

(65) Prior Publication Data

US 2013/0013282 A1 Jan. 10, 2013

(30) Foreign Application Priority Data

Jul. 8, 2011 (JP) ................. 2011-152266

(51) Int. Cl.
*G06F 17/50* (2006.01)
*G21D 3/00* (2006.01)
*G21C 17/00* (2006.01)
*G21C 17/108* (2006.01)

(52) U.S. Cl.
CPC ............ *G21D 3/001* (2013.01); *G21C 17/00* (2013.01); *G21C 17/108* (2013.01); *G21D 2003/005* (2013.01); *Y02E 30/39* (2013.01)
USPC ....... 703/2; 703/6; 703/18; 376/216; 376/241

(58) Field of Classification Search
USPC .............................. 703/2, 6, 18; 376/216, 241
See application file for complete search history.

(56) References Cited

U.S. PATENT DOCUMENTS

| 4,734,249 A * | 3/1988 | Utamura et al. ............... 376/214 |
|---|---|---|
| 5,555,279 A * | 9/1996 | Nir et al. ....................... 376/216 |
| 6,173,026 B1 | 1/2001 | Mowry et al. |
| 7,844,440 B2 * | 11/2010 | Nasle et al. ..................... 703/18 |
| 2013/0058447 A1 * | 3/2013 | Takeuchi et al. ............... 376/241 |

* cited by examiner

*Primary Examiner* — Thai Phan
(74) *Attorney, Agent, or Firm* — Oblon, McClelland, Maier & Neustadt, L.L.P.

(57) ABSTRACT

An apparatus for monitoring nuclear thermal hydraulic stability of a nuclear reactor, contains: a calculation unit configured to calculate a stability index of a nuclear thermal hydraulic phenomenon based on nuclear instrumentation signals, the signals being outputted by a plurality of nuclear instrumentation detectors placed at regular intervals in a reactor core; a simulation unit configured to simulate the nuclear thermal hydraulic phenomenon based on a physical model by using information on an operating state of the nuclear reactor as an input condition; a limit value updating unit configured to update a limit value of the nuclear thermal hydraulic phenomenon based on a result of the simulation; and a determination unit configured to determine, based on the stability index and the limit value, whether or not to activate a power oscillation suppressing device.

12 Claims, 10 Drawing Sheets

| CHANNEL GROUP | DECAY RATIO | FREQUENCY |
|---|---|---|
| 1 | 0.75 | 0.43 |
| 2 | 0.60 | 0.41 |
| 3 | 0.55 | 0.40 |
| 4 | 0.48 | 0.40 |
| 5 | 0.33 | 0.38 |
| 6 | 0.25 | 0.36 |
| 7 | 0.11 | 0.33 |
| 8 | 0.01 | 0.30 |
| REACTOR CORE | 0.58 | 0.35 |

FIG. 13

US 8,983,810 B2

APPARATUS, METHOD AND PROGRAM FOR MONITORING NUCLEAR THERMAL HYDRAULIC STABILITY OF NUCLEAR REACTOR

CROSS-REFERENCE TO RELATED APPLICATIONS

This application is based upon and claims the benefit of priority from Japanese Patient application No. 2011-152266, filed on Jul. 8, 2011, the entire contents of each of which are incorporated herein by reference.

FIELD

Embodiments of the present invention relate to a technology for monitoring nuclear thermal hydraulic stability of a boiling water reactor.

BACKGROUND

In the boiling water reactor (BWR), output power can be controlled by changing a core flow and thereby changing a steam ratio (void fraction) inside a boiling reactor core.

However, it is known that depending on the core flow and other operating conditions, neutron flux distribution and liquidity in the reactor core are destabilized by delayed transportation of voids and a negative feedback effect caused by negative void reactivity coefficients in the reactor core.

There is concern that occurrence of such a nuclear thermal hydraulic destabilization phenomenon may result in considerable oscillation of output power and flow rate, which may deteriorate cooling characteristics in terms of fuel rod surface temperature and may damage the soundness of fuel rod cladding tubes.

Accordingly, in designing fuels and reactor cores for the boiling water reactor, the nuclear thermal hydraulic stability is analyzed to produce a design that gives sufficient margin to stability so as to prevent such an oscillation phenomenon from occurring in any of the expected operating ranges.

In such a range where deterioration in nuclear thermal hydraulic stability is expected, limited operation is preset for safety. Nuclear reactors of some types are provided with a safety setting so that in the unlikely event where the nuclear reactor reaches the operation limited range, output power is lowered by insertion of control rods and the like so that the nuclear reactor can get out of the operation limited range.

As the boiling water reactors are designed to have a larger size, a higher power density and a higher burn-up, their nuclear thermal hydraulic stability is generally lowered. However, measures for such boiling water reactors are not included in the above-stated safety setting.

In the case of operating the nuclear reactors which show good results in the U.S. at higher power, an operation control curve is expanded to a high-power side, which tends to increase a power/flow rate ratio and to deteriorate nuclear thermal hydraulic stability. In this case, according to the aforementioned safety setting, an operation control curve may possibly intersect a stability control curve in a low flow rate range. Consequently, an operable range on a low flow-rate side is largely limited, and operation at the time of activation and stop of the nuclear reactors may also be affected.

Under these circumstances, there are a large number of nuclear power plants which allow, from a viewpoint of Detect and Suppress, power oscillation phenomena while accurately detecting the power oscillation phenomena attributed to nuclear thermal hydraulic destabilization and suppressing the oscillations before the fuel soundness is damaged.

Accordingly, a power oscillation detection algorithm with use of dedicated detection signals for detecting the power oscillation phenomenon, which is referred to as OPRM (Oscillation Power Range Monitor), has been proposed (see, for example, U.S. Pat. No. 5,555,279 and U.S. Pat. No. 6,173,026).

As the performance of the boiling water reactors is reinforced to have a larger size, a higher power density, a higher burn-up and a higher power as described before, the substantial operating range is expanded, and thereby degree of allowances for nuclear thermal hydraulic stability is inevitably declined. In order to fully demonstrate an advantage of the reinforced performance of such boiling water reactors, it is required to further enhance accuracy and reliability in monitoring nuclear thermal hydraulic stability more than before.

DETAILED DESCRIPTION

The embodiments of the present invention will be described hereinbelow with reference to the accompanying drawings.

Figure 1:
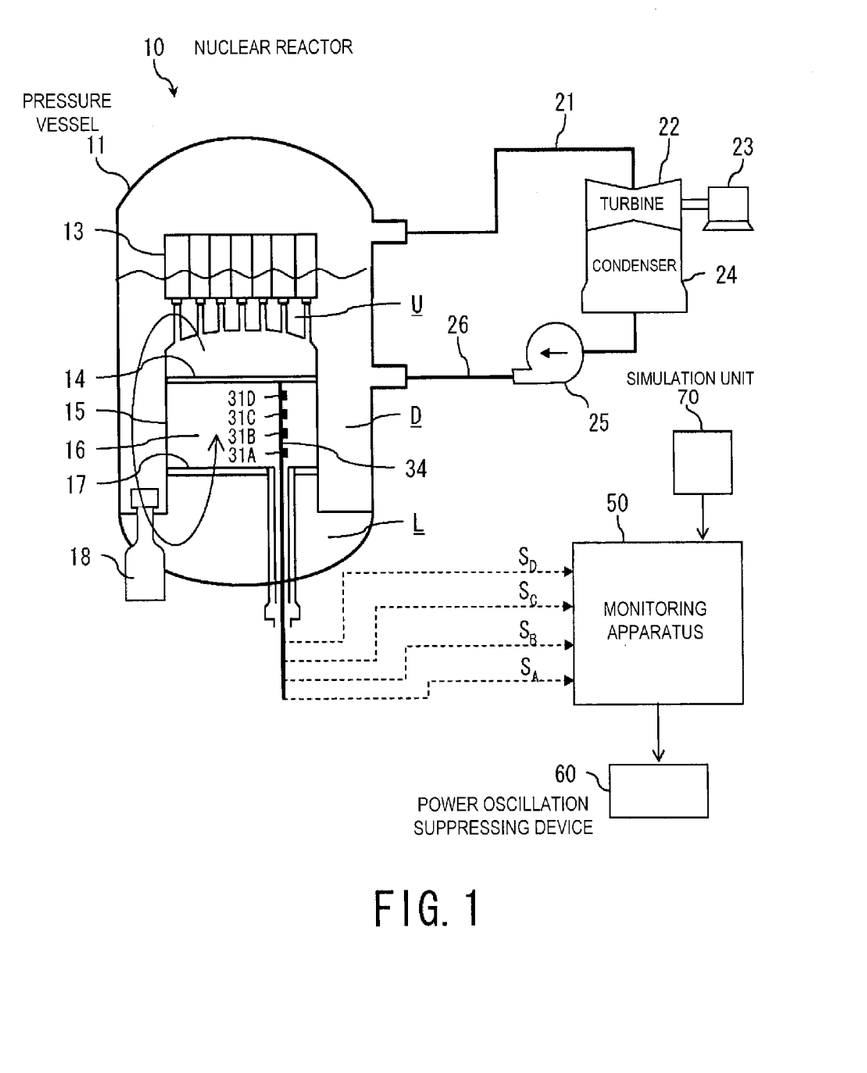
FIG. 1 is a longitudinal sectional view showing a nuclear power plant applied an embodiment of an apparatus for monitoring nuclear thermal hydraulic stability of a nuclear reactor according to the present invention.

A nuclear power generation system shown in FIG. 1 includes: a nuclear reactor 10 which heats furnace water by the heat generated through nuclear fission of nuclear fuel and thereby generates steam; a main line 21 which guides the generated steam to a turbine 22; a generator 23 coaxially connected with the turbine 22 which is rotationally driven by the steam to convert rotational kinetic energy to electric energy; a condenser 24 which cools and condenses the steam, which was expanded in the process of doing its work in the turbine 22, into condensate water; and a water supply line 26 which sends the condensate water to the nuclear reactor 10 with a pump 25.

Feed water returned to the nuclear reactor 10 is reheated as furnace water, and the above-stated process is repeated to perform continuous power generation. To sustain the power generation in a stable manner, a nuclear thermal hydraulic stability monitoring apparatus 50 (hereinafter referred to as "monitoring apparatus 50") of the nuclear reactor 10 is provided.

The nuclear reactor 10 includes: a pressure vessel 11 filled with furnace water and provided with a shroud 15 fixed to the inside thereof; a core support plate 17 fixed to the shroud 15; a reactor core 16 enclosed by the shroud 15 which is supported by the core support plate 17; and a steam separator 13 which performs gas-liquid separation of the furnace water which has been changed into a gas-liquid two-phase flow by passing through the reactor core 16.

The steam as the one product obtained by steam separation in the steam separator 13 is guided to the main line 21 as described above so as to contribute to power generation, while the other product obtained as separated water joins the feed water returned through the water supply line 26. The thus-joined furnace water is made to flow down an area (downcomer D) between the shroud 15 and the pressure vessel 11 with a plurality of recirculation pumps 18 (only one pump is described in the drawing) provided in a circumferential direction, and is guided to a lower plenum area L.

The furnace water guided to the lower plenum area L again passes the reactor core 16, where the water is heated into a gas-liquid two-phase flow before reaching an upper plenum area U. The gas-liquid two-phase flow that reached the upper plenum area U is again guided to the steam separator 13, where the aforementioned process is repeated.

Figure 2:
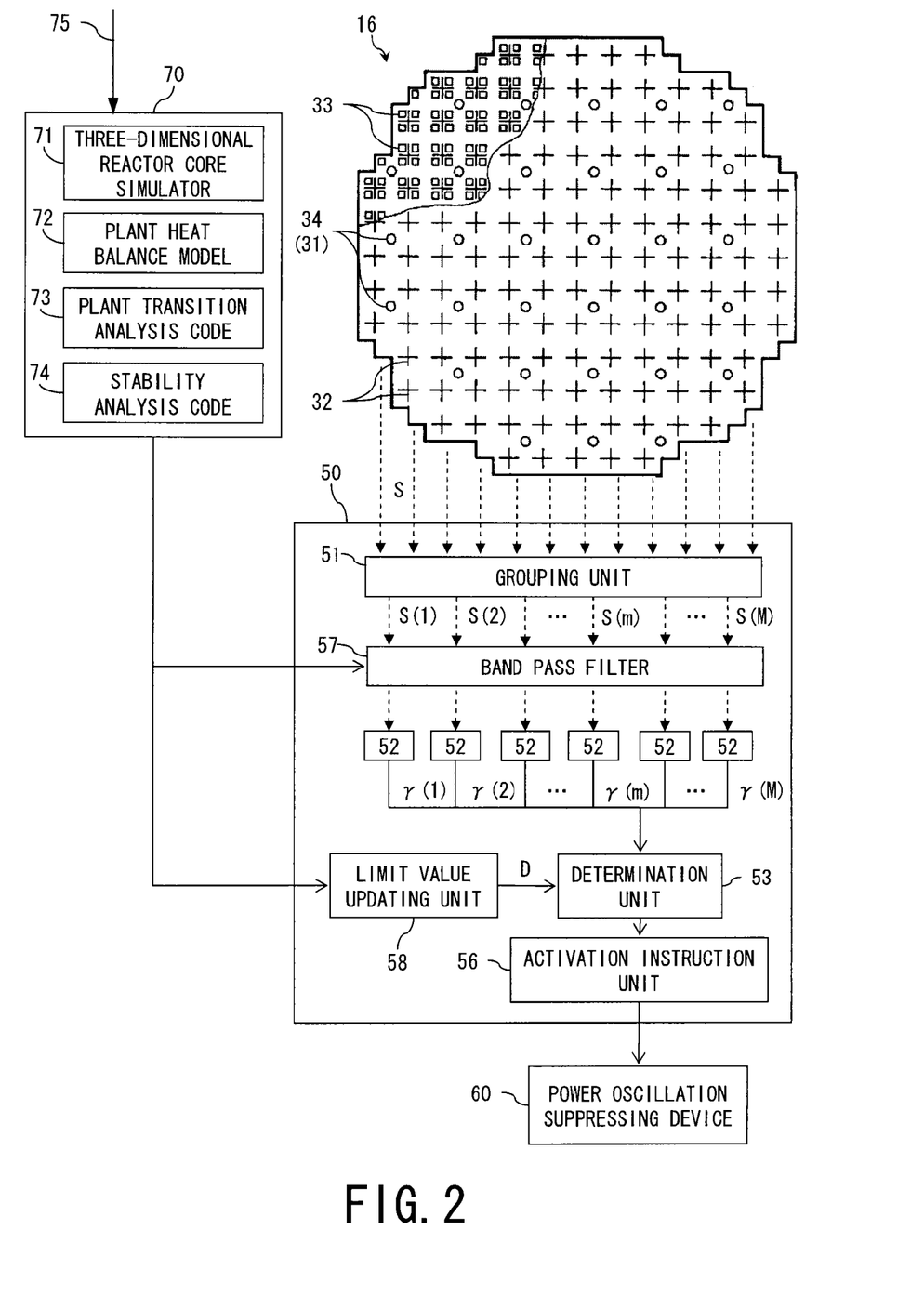
FIG. 2 is a block diagram showing an embodiment of an apparatus for monitoring nuclear thermal hydraulic stability of the nuclear reactor according to the present invention.

As shown in a horizontal sectional view of FIG. 2, the reactor core 16 includes: a square cylinder-shaped fuel assembly 33 containing a large number of fuel rods (omitted in the drawing); a control rod 32 which absorbs neutrons generated by a nuclear fission reaction to control output power; and an instrumentation pipe 34 whose upper and lower ends are respectively fixed to an upper grid plate 14 and the core support plate 17 and which supports nuclear instrumentation detectors 31 (31A, 31B, 31C, 31D) for detecting the neutrons as shown in FIG. 1. A large number of these component members are arrayed to structure the reactor core 16.

One instrumentation pipe 34 is generally provided for 16 fuel assemblies 33. For example, an advanced boiling water reactor including 872 fuel assemblies is equipped with 52 instrumentation pipes 34.

The nuclear instrumentation detectors 31A, 31B, 31C, 31D provided at four positions in a perpendicular direction of the instrumentation pipe 34 are each referred to as a level A, a level B, a level C, and a level D in accordance with a height position from the lower side. The furnace water which circulates inside the reactor core 16 flows into the furnace from the level A, where the furnace water is heated with fuel and starts to boil. The furnace water reaches the level B, the level C, and the level D in sequence while its water/steam two-phase state is being changed.

The nuclear thermal hydraulic stability is greatly influenced by pressure propagation in the water/steam two-phase state.

More specifically, due to a delay in pressure propagation of the furnace water which flows from the lower side to the upper side in the reactor core 16 as shown in FIG. 1, the two-phase state (water and steam ratio) is changed. This causes a response delay of the nuclear instrumentation detectors 31A, 31B, 31C, 31D, which in turn causes phase difference between the respective nuclear instrumentation signals S ($S_A$, $S_B$, $S_C$, $S_D$) detected at the level A, the level B, the level C, and the level D.

Such phase difference in power oscillations in a flow direction of furnace water has a mechanism of causing mutual cancellation of the responses of the nuclear instrumentation signals S. Therefore, from the viewpoint of accuracy and reliability in monitoring the nuclear thermal hydraulic stability, it is preferable that a plurality of the nuclear instrumentation signals S at the same height level are grouped and evaluation is performed for each group.

The necessity of performing stability monitoring on all the levels from the level A to level D is low. Accordingly, in each of the embodiments, evaluation of the nuclear thermal hydraulic stability is performed by targeting a level B group, which is generally said to have the highest sensibility for stability monitoring.

The power oscillations relating to the nuclear thermal hydraulic stability are a macroscopic phenomenon which occurs in the entire reactor core due to destabilization of flow conditions inside a fuel channel which encloses the fuel assembly 33, the destabilization being caused by reactivity feedback to dynamic responses of neutron fluxes. It is considered that the reactivity feedback excites a neutron flux space mode, which results in occurrence of power oscillations.

When the excited space mode is a basic mode, the power oscillations caused thereby are called core-wide oscillations. The core-wide oscillations basically have the same phase in each of the reactor core cross section at the same height level. In this case, a plurality of nuclear instrumentation signals S measured in the same cross section have almost no phase difference from each other. They are not cancelled by addition, and therefore oscillations can sufficiently be detected with use of average power range monitor (APRM) signals.

In contrast, when the excited space mode is a higher order mode, the oscillations thereby are called regional oscillations. According to the higher order space mode distribution, the nuclear instrumentation signals S in the reactor core cross section at the same height have phase difference from each other. With a node of the higher order space mode distribution as a center line of oscillations, 180-degree phase difference appears across the center line, and oscillations are reversed at this center line.

Figure 3A:
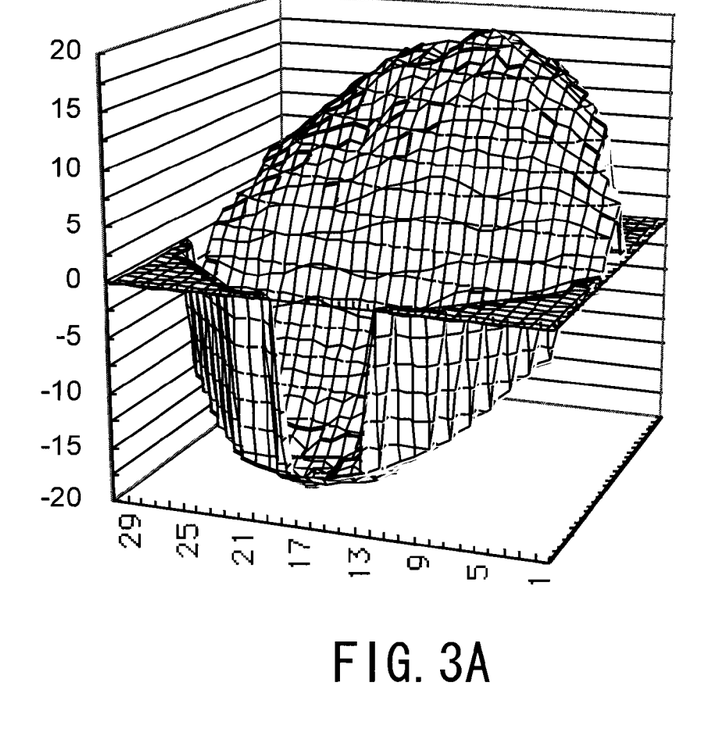
FIGS. 3A and 3B are explanatory views showing regional oscillations and a higher order space mode distribution.

FIG. 3A shows a higher order space mode distribution in the regional oscillations. As shown in the horizontal cross sectional view of FIG. 3B, two areas a and b across an oscillation center line c, which corresponds to a node, are opposite in phase from each other, i.e., they oscillate with 180-degree phase difference from each other.

Figure 3B:
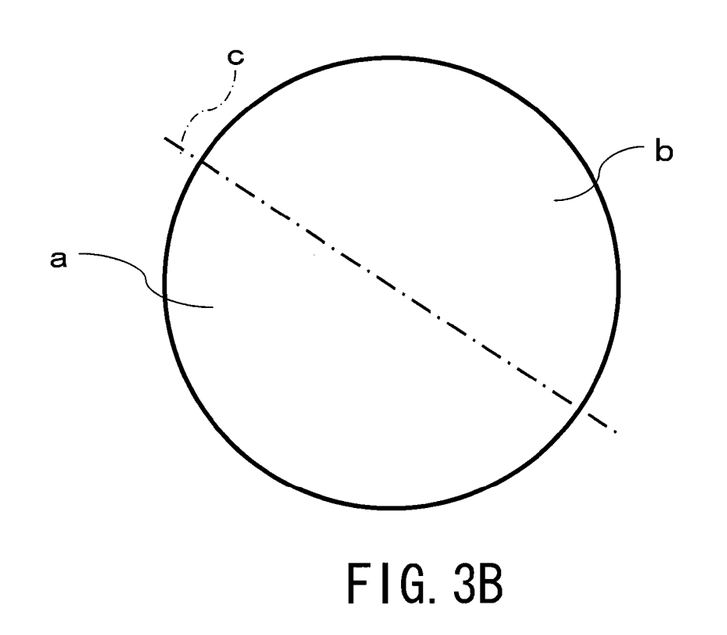

In this case, if a plurality of the nuclear instrumentation signals S across these two areas a and b are averaged, oscillations are cancelled due to the phase difference. Accordingly, the amplitude of the averaged signals is flattened and this makes it difficult to detect oscillations. In short, it is not suitable for detection of such regional oscillations to use the APRM signal outputted as a signal formed by averaging all the reactor core signals.

Although not shown in the drawings, use of the APRM signal is also unsuitable in the case of detecting local power oscillations which occur in a narrow area centering around a certain specific fuel assembly 33 (FIG. 2).

As shown in FIGS. 1 and 2, the monitoring apparatus 50 includes: a calculation unit 52 which calculates a stability index (indicated as a decay ratio γ) of a nuclear thermal hydraulic phenomenon based on nuclear instrumentation signals S, the signals S being outputted by a plurality of nuclear instrumentation detectors 31 placed at regular intervals in a reactor core 16; a simulation unit 70 which simulates the nuclear thermal hydraulic phenomenon based on a physical model by using information on an operating state of the nuclear reactor as an input condition 75; a limit value updating unit 58 which updates a limit value D of the nuclear thermal hydraulic phenomenon based on a result of the simulation; and a determination unit 53 which determines, based on the stability index (indicated as a decay ratio γ) and the limit value D, whether or not to activate a power oscillation suppressing device 60.

Since the monitoring apparatus 50 is structured in this way, the limit value D is updated to be optimal for the plant state based on a result of estimating the plant state or a result of predicting the state shift with use of the physical model.

The determination unit 53 reads every updated limit value D, and determines whether or not a nuclear thermal hydraulic destabilization phenomenon is occurring with reference to a stability index (indicated as a decay ratio γ). When it is determined that the nuclear thermal hydraulic destabilization phenomenon is occurring, the determination unit 53 commands an activation instruction unit 56 to activate the power oscillation suppressing device 60 (e.g., warning devices and control rod insertion devices).

Accuracy and reliability in monitoring the power oscillation phenomenon with the monitoring apparatus 50 are enhanced by combining the physical model which phenomenalizes the nuclear thermal hydraulic stability and the nuclear instrumentation signals S that are actual measured data.

Figure 4:
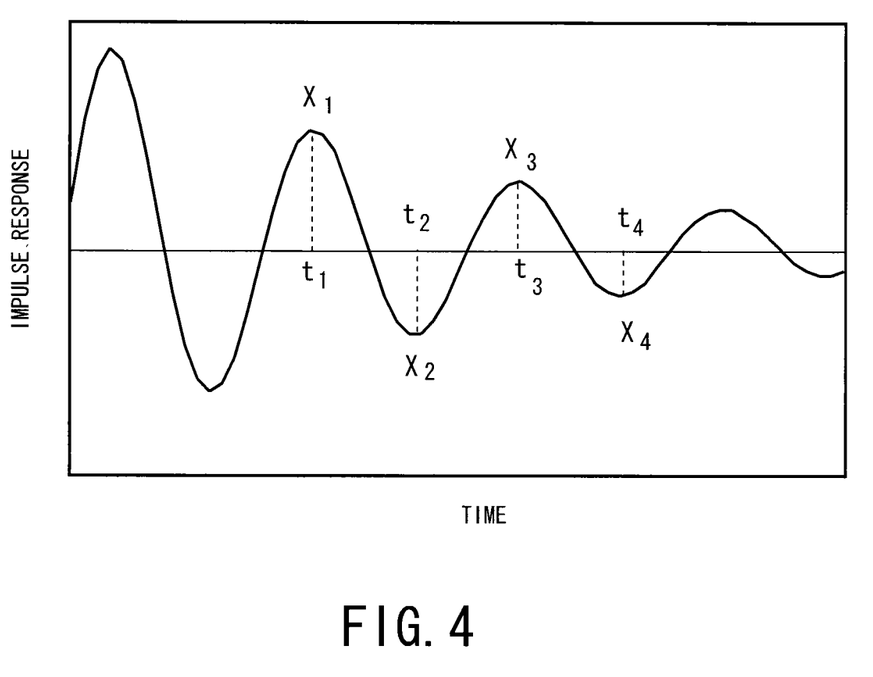
FIG. 4 is a graph view showing the waveform of an oscillatory impulse response when disturbance is applied to a system.

Now, with reference to FIG. 4, a decay ratio, an oscillation period, and amplitude will be defined by using an oscillatory impulse response at the time of applying disturbance to a system. Assuming that peaks of the impulse response are set in order as $X_1, X_2, X_3, X_4, \ldots$, and their appearing time are each set as $t_1, t_2, t_3, t_4, \ldots$, the decay ratio, the oscillation period, and the amplitude, which are generally used as indexes indicating the stability of the nuclear thermal hydraulic stability, are defined as follows:

Decay ratio=$(X_3-X_4)/(X_1-X_2)$

Oscillation period=$(t_3-t_1)$ or $(t_4-t_2)$

Amplitude=$(X_3-X_4)$ or $(X_1-X_2)$

As for the phase difference, a time difference in $t_n$ between a plurality of signals is defined as an angle with one period being 360 degrees.

If the decay ratio is less than 1, the impulse response is attenuated and therefore the system is stable, whereas if the decay ratio is more than 1, oscillations grow and the system becomes unstable. When the decay ratio is 1, the oscillations continue with constant amplitude.

With a shorter oscillation period, oscillations grow or attenuate more quickly. An inverse of the oscillation period is generally referred to as a resonance frequency or a natural frequency, which is expressed in the unit of Hz or cps.

The calculation unit 52 shown in FIG. 2 can obtain a decay ratio, an oscillation period, and amplitude of each nuclear instrumentation signal S as stability indexes. Further, the decay ratio, the oscillation period, the amplitude and the like may statistically be processed for every group of the nuclear instrumentation detectors 31 grouped by a grouping unit 51, and the data obtained by the statistic processing may be used as a stability index.

The physical model executed by the simulation unit 70 includes: a three-dimensional reactor core simulator 71 which simulates a three-dimensional distribution of the nuclear thermal hydraulic phenomenon inside the reactor core; a plant heat balance model 72 which simulates a heat balance of the entire plant including a BOP (Balance Of Plant) system; a plant transition analysis code 73 which simulates a transient characteristic of the plant focusing on a reactor system; and a stability analysis code 74 which analyzes stability of the nuclear thermal hydraulic phenomenon in an arbitrary operating state based on results of these simulations.

Although not shown in the drawings, the monitoring apparatus 50 further includes: a data interface unit which transmits the input condition 75 and data between the respective codes; and a man machine interface unit which displays or outputs an analysis result based on an instruction from an operator.

In these physical models, values of non-observing parameters inside the reactor core are estimated by reflecting the latest state (plant heat balance and control rod insertion condition) of the actual plant as the input condition 75. These physical models also make it possible to perform prediction and like of the plant state in the case of a transient event such as trip of a recirculation core flow pump in the present operating state and the like.

An operation example with the physical models in the latter case (prediction of the plant state in a transient event) is shown below.

First, the present plant state is read in from a process computer, measurement signals and the like. A heat balance of the present plant is estimated with the model 72, and then the detailed states of the present reactor core are presumed with the three-dimensional reactor core simulator 71. As a consequence, the detail of the present plant and reactor core states are simulated with the physical models.

Next, assuming a transient state which may possibly be generated in this plant state, an operating state in which the nuclear thermal hydraulic stability state is predicted is set. A transient state corresponding to the operating state is simulated by the plant transition analysis code 73, and a plant operating state to be shifted as a result of the transient event is predicted.

Then, the reactor core state in this plant operating state is again simulated by the three-dimensional reactor core simulator 71. Based on the reactor core state acquired as a result of the simulation, the stability analysis code 74 is executed to predict the stability after the transient event.

With use of the results of such simulations in the simulation unit 70, the limit value updating unit 58 changes the limit value D.

A band pass filter 57 is to extract frequency components corresponding to power oscillations in the nuclear instrumentation signal S. The stability index is calculated based on the extracted frequency components.

Various fluctuation components are included in the nuclear instrumentation signal S outputted by the nuclear instrumentation detector 31. A fluctuation period of the nuclear thermal hydraulic phenomenon is correlated with time at which the two-phase flow passes the reactor core in a perpendicular direction, and takes a typical value in accordance with the operating state.

More specifically, when the core flow is large as in a rated operation state, the oscillation period is about 1 second, i.e., the oscillation frequency takes a typical value of around 1 Hz. In contrast, in a partial power output state where the nuclear thermal hydraulic stability tends to decline, the core flow is lower than that in the rated operation state. Consequently, the oscillation period is about several seconds, and the oscillation frequency takes a typical value of about 0.3 to 0.6 Hz.

The period of such power oscillations of the reactor core can be evaluated by the stability analysis code 74 in the simulation unit 70. Thus, if the period or the frequency band of the oscillatory phenomenon to be monitored is predicted, it is possible to remove fluctuation components not included in the monitoring objects from the nuclear instrumentation signal S to enhance monitoring accuracy.

Figure 5:
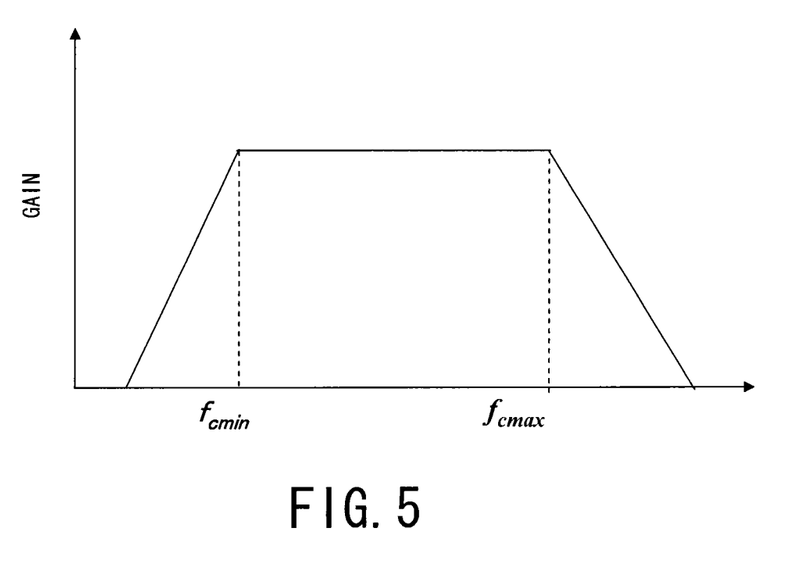
FIG. 5 is a characteristic graph view showing a band pass filter.

FIG. 5 shows a characteristic graph view of the band pass filter 57.

A description is now given of a method for setting a time constant of the filter, i.e., a method for setting a lower limit value $f_{cmin}$ and an upper limit value $f_{cmax}$ of a frequency pass-band.

Figure 6A:
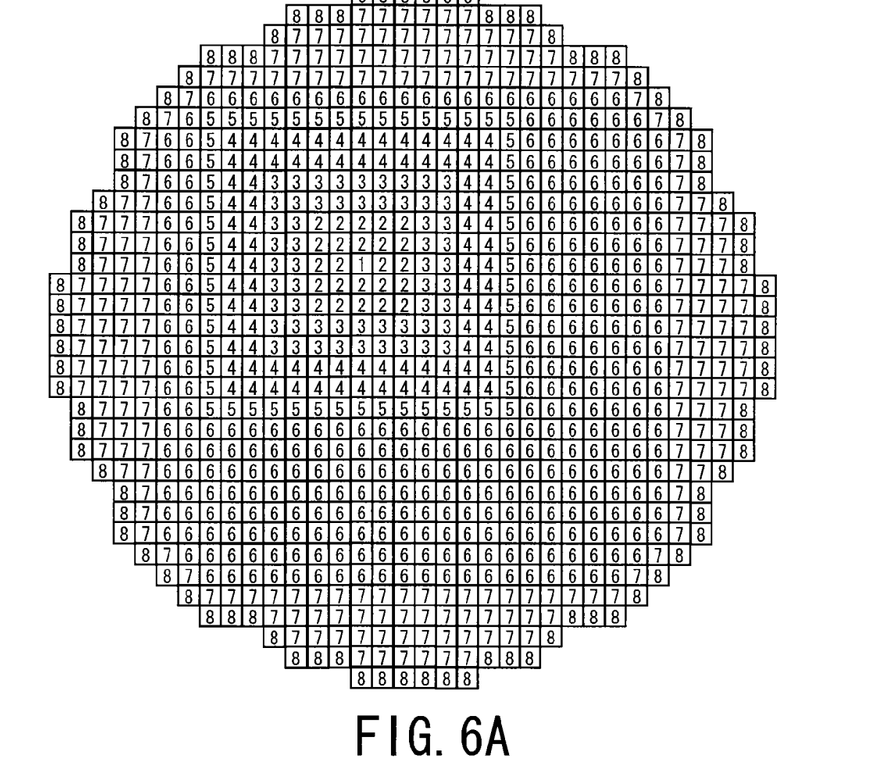
FIG. 6A is a view showing channel groups each composed of fuel assemblies similar in fuel characteristics.

Before setting the lower limit value $f_{cmin}$ and upper limit value $f_{cmax}$, fuel assemblies similar in fuel characteristics are grouped into channel groups as shown in a FIG. 6A, and stability analysis is carried out for every group.

Figure 6B:
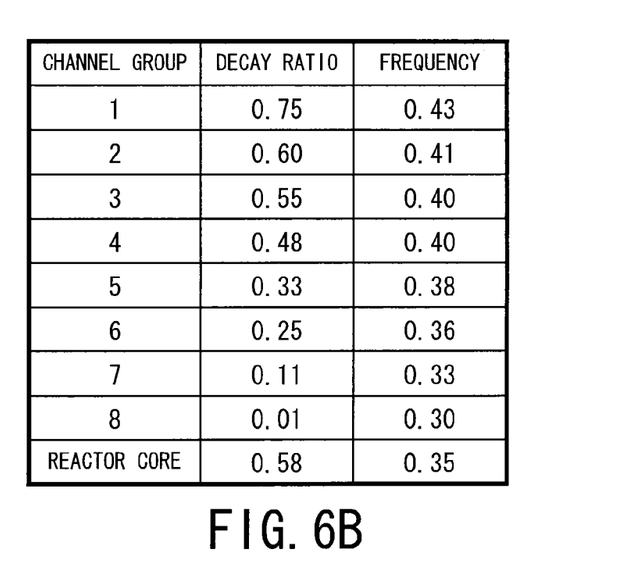
FIG. 6B is a table showing a result of analyzing thermal hydraulic stability for every channel group.

FIG. 6B shows a result of analyzing thermal hydraulic stability for every channel group.

Since the frequency is estimated for every channel group, it can be concluded that such a frequency range may be set as a frequency pass-band of the band pass filter 57.

In FIG. 6, the nuclear thermal hydraulic stability is evaluated based on a core stability decay ratio. However, grouping the fuel assemblies into channel groups makes it possible to conduct analysis with respect to a regional stability decay ratio other than the core stability decay ratio.

The regional stability decay ratio and the frequency of each channel group are obtained in a similar manner. Assuming the minimum value of the frequency to be $f_1$ and the maximum value to be $f_2$, $f_{cmin} \leq f_1 < f_2 \leq f_{cmax}$ is set as an index for use in setting the time constant of the band pass filter 57.

As an index of setting a reference oscillation period TREF, $1/f_2 \leq TREF \leq 1/f_1$ can be set.

Thus, determination based on the stability index and the limit value is performed for at least one object among not only the aforementioned core stability decay ratio and the regional stability decay ratio, but also a decay ratio of the nuclear instrumentation signal which is representative of those grouped by characteristics of fuel assemblies placed in the reactor core, a decay ratio of the nuclear instrumentation signal which reflects a thermal hydraulic phenomenon of a most thermally severe fuel assembly, and natural frequencies of these nuclear instrumentation signals.

In the aforementioned inequalities, only the upper limit value or the lower limit value of a set point was specified. However, in order to provide concrete set values, it is necessary to take the following two uncertainties into consideration. The two uncertainties are an uncertainty at the time of predicting an actual phenomenon in the stability analysis code as a physical model, and an uncertainty of an operating state in which the stability is predicted. The latter uncertainty includes an uncertainty relating to measurement errors of detectors which measure the operating state and an uncertainty relating to errors at the time of estimating operation parameters based on measurement results of the detectors.

As for the uncertainty of the stability analysis code (simulation result), data on a stability test performed in an actual plant or data on a stability test performed in a testing device, which can simulate observed power oscillation phenomena and nuclear thermal hydraulic stability phenomena, are used as reference data, and results of simulating and analyzing these states are compared with the reference data so that an error between the analysis data and the reference data is evaluated.

An error $\epsilon_a$ is composed of a bias and a standard deviation and is expressed as $\epsilon_a = <\epsilon_a> \pm \sigma_a$, where the first term in the right hand side represents the bias, and the second term represents the standard deviation of the error. These values are all known values obtained by verification of the stability analysis code 74. It is to be noted that the bias is herein defined as (true value−analytic value).

The uncertainty of the stability at an operating point is more complicated. Since evaluation of the uncertainty with use of actual data is difficult, the uncertainty evaluation with use of the stability analysis code 74 is also necessary therefor.

More specifically, first of all, there is an uncertainty with respect to specification of the operating points. There are a large number of parameters which influence the nuclear thermal hydraulic stability and these parameters intricately relate to each other. Herein, the uncertainty is considered particularly with respect to the parameters having a large influence.

The parameters such as output power, flow rate, pressure, and reactor core inlet temperature have an uncertainty relating to measurement. As for power distribution, there is an uncertainty caused by overlap of measurement errors of detectors and errors in prediction of a distribution based on detector data.

As for eigenvalue separation of the higher order mode required for regional stability analysis, an estimation method based on observational data with sufficient accuracy has not yet been established. Accordingly, the uncertainty thereof is considered to be attributed to errors of a higher order mode analysis function which is incorporated in the three-dimensional reactor core simulator 71.

With respect to these observation errors or calculation errors, uncertainties (variations from a true value) of targeted parameters are specified, and then stability analysis is conducted in consideration of the variations of those parameters. As a result, stability error $\epsilon_b$ resulting from the uncertainty of the operating condition is evaluated.

This error is also composed of a bias and a standard deviation and can be expressed as $\epsilon_b = <\epsilon_b> \pm \sigma_b$.

Figure 7:
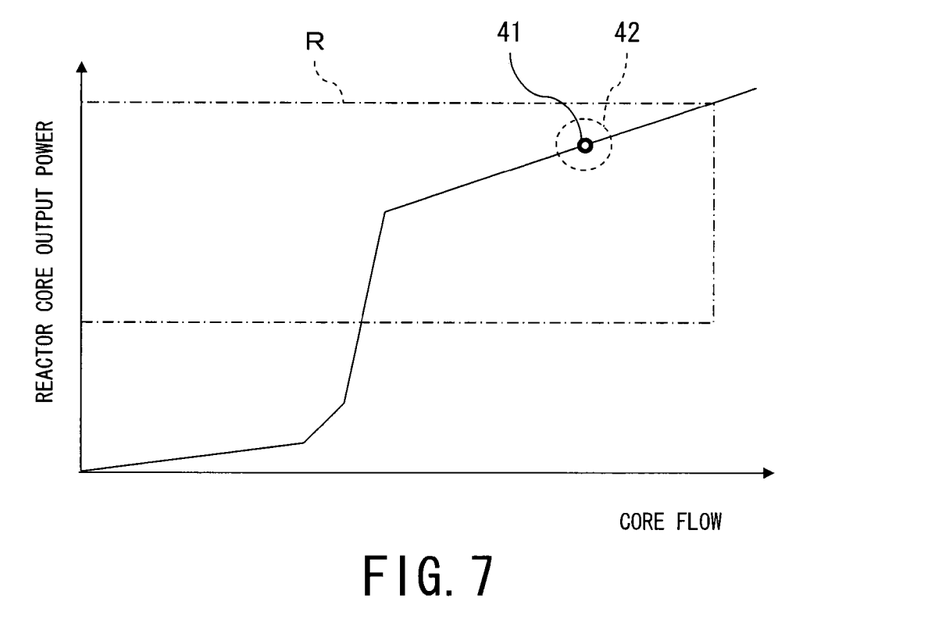
FIG. 7 is a graph view showing an operation line of a nuclear reactor.

In an operation line of the nuclear reactor shown in FIG. 7, a stability monitoring range R that is a monitoring object of the power oscillation phenomenon is shown with a dashed dotted line. In this case, an operating point 41 on the operation line is set as a monitoring object. The operating point 41 has an uncertainty range 42 shown with a broken line. The uncertainty range includes an uncertainty attributed to measurement errors in measuring output power and flow rate and an uncertainty attributed to an uncertainty of setting conditions at the time of shifting from a normal operation state to a pertinent operating state. The uncertainty attributed to the latter (uncertainty of setting conditions) can be evaluated with use of the plant transition analysis code 73.

When the uncertainty of the operating condition can be specified in this way, associated parameters can be changed at random within a range of the variations, and stability analysis can be performed multiple times.

Figure 8:
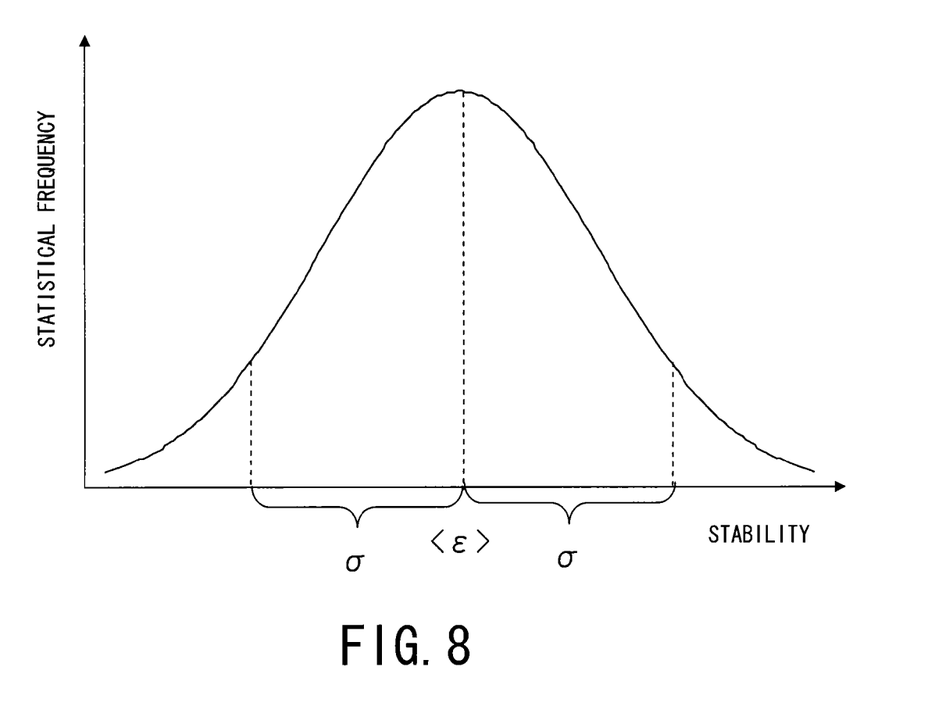
FIG. 8 is a graph view showing a frequency distribution of stability obtained a plurality of times based on an uncertainty of operating conditions.

FIG. 8 shows a frequency distribution of the stability (decay ratio and natural frequency) obtained multiple times based on the uncertainty of the operating condition.

As shown in the graph view, the stability forms a normal distribution, in which a central value represents a bias $\langle\epsilon\rangle$, and the right and left ranges represent variations or standard deviations $\sigma$. In this case, if 95% is taken as a variation limit for example, the standard deviation is increased 1.96 times.

Thus, it becomes possible to decide a final error by overlapping an error of the stability based on the uncertainty of the operating state and a prediction error of the stability analysis code.

Figure 9:
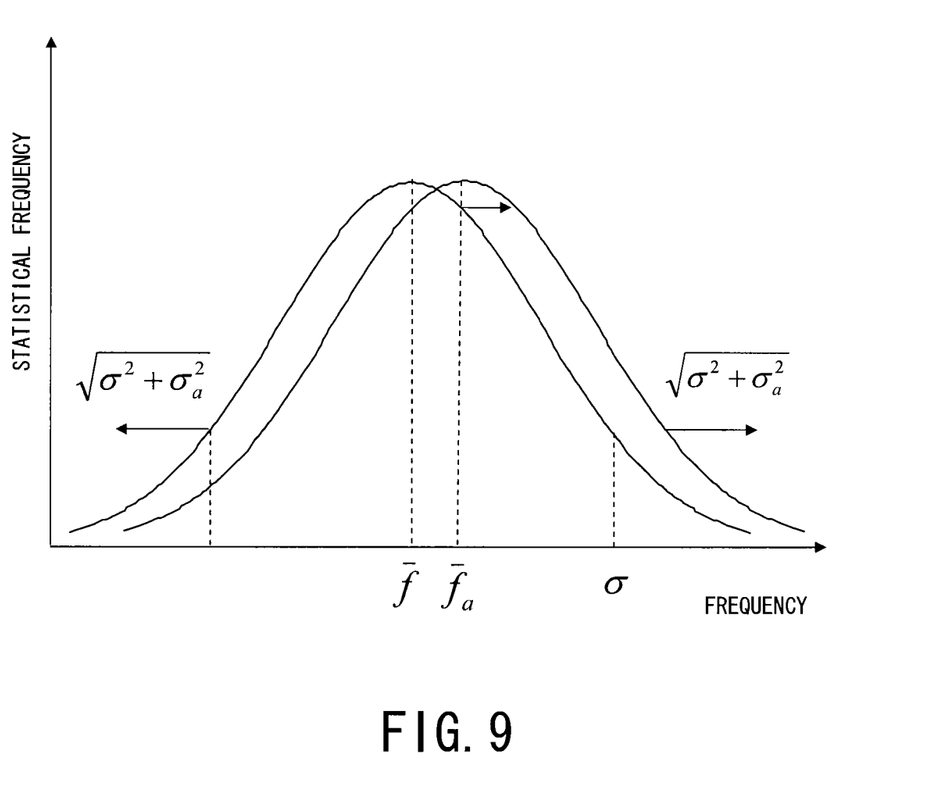
FIG. 9 is a graph view showing a frequency distribution of stability including prediction errors of an analysis code.

In FIG. 9, both distributions of analysis results of the stability include prediction errors of the analysis code. Accordingly, when these prediction errors are added thereto, the distribution of the analysis result of the stability is further expanded.

When the oscillation period is again taken as an example, the aforementioned uncertainty is added to the upper and lower limit values of the frequency, which is an inverse of the oscillation period. In this case, the bias and the standard deviation need to be set in the direction of expanding the variation range.

More specifically, if the bias is positive, operation is performed so that the bias is taken into consideration on the right-hand side of the center of the normal distribution in FIG. 9, whereas the bias is not taken into consideration on the left-hand side. If the bias is negative, reversed operation is performed. Since the standard deviation is a positive value, the value can be added as it is.

FIG. 9 shows an example of the oscillation period when the bias is positive.

An upper limit value is obtained by adding a frequency bias $f_a$ of the analysis code to an average value $\langle f \rangle$ of the periods in consideration of the uncertainty of the operating state, and then adjusting the average value $\langle f \rangle$ with a square root sum of a standard deviation $\sigma$ of frequency in the operating state and a standard deviation $\sigma_a$ of a frequency error of the analysis code, the value being expressed by $f_{max}=\langle f \rangle + f_a + X\sqrt{(\sigma^2 + \sigma_a^2)}$.

In this equation, X is an adjustment factor for a fiducial interval. If the adjustment factor is 95%, the value X is set at 1.96.

In contrast, a lower limit value is obtained by $f_{min}=\langle f \rangle - f_a + X\sqrt{(\sigma^2 + \sigma_a^2)}$.

As for the average value $\langle f \rangle$ of the periods, a value corresponding to the maximum value $f_2$ is used as an upper limit, while a value corresponding to the minimum value $f_1$ is used as a lower limit. When these values are not preinstalled, the values obtained by the stability analysis code 74 may be used as they are, and only correction concerning variations may be performed.

Another important parameter of the stability is a decay ratio. When the decay ratio value is large, it indicates high probability that power fluctuation is a phenomenon based on the nuclear thermal hydraulic stability. Conversely, when the decay ratio value is small, it indicates a high likelihood that power fluctuation is a phenomenon based on mechanisms other than the nuclear thermal hydraulic stability.

Accordingly, it is possible to set a severe determination criterion for the power oscillations.

More specifically, the limit value D is a factor used in combination of the stability index in the determination unit 53 to determine whether or not to activate the power oscillation suppressing device 60. Activation conditions of the power oscillation suppressing device 60 can be optimized by changing the limit value D based on the factors, other than the stability index, which contribute to the power fluctuation mechanisms.

Here, there is considered a case where the number of times that the stability index exceeds a predetermined specified value is set as the limit value D in the determination unit 53. A probability of erroneous determination with a smaller decay ratio is lowered by setting the set number larger than an initial set value of the limit value D. On the contrary, when an estimated decay ratio value is large, and particularly when the value is estimated to be more than 1 and in an unstable state, extremely swift detection can be achieved by setting the limit value D at a minimum value of 2.

In this case, in consideration of an uncertainty as in the case of the aforementioned oscillation frequency, an upper limit value of the decay ratio $\gamma$ is set as $\gamma_{max}=\langle\gamma\rangle+\gamma_a+X\sqrt{(\sigma^2+\sigma_a^2)}$.

If this value is over 1 and a set value of the oscillation frequency is N, then $\gamma_{max}^{N/2}$ is a maximum growth rate of amplitude during that time.

Therefore, if an allowed maximum growth rate is set as $G_{max}$, then $N<2\log(G_{max})/\log(\gamma_{max})$ is obtained.

As for the maximum growth rate, if allowed maximum amplitude from a viewpoint of fuel soundness is $S_{max}$ and an amplitude threshold at the start of oscillation detection is $S_{min}$, an upper limit value is set as $G_{max} \leq S_{max}/S_{min}$.

Therefore, if a value smaller than a reference oscillation frequency set value $N_p$ is acquired from the above calculation, the set frequency is lowered to that value.

$$N_p = N_p (N \geq N_p)$$

$$N_p = N (N < N_p)$$

If N is a value as small as 2 or less in the above equation, only the amplitude $S_{max}$ is used and general oscillation detection process including oscillation detection determination and trip activation can be bypassed. However, the general oscillation detection process is not bypassed if the stability is determined not in the actual plant operating state but in the state after a transient state that can be expected, such as pump stop, from the current plant operating state.

Next, if X takes a large value, e.g., 6, and $\gamma_{max}=\langle\gamma\rangle+\gamma_a+X\sqrt{(\sigma^2+\sigma_a^2)}$ is less than 1, then it indicates a high probability of oscillations not growing but attenuating. In this case, the upper limit value $N_{max}$ is provided and the set value is changed between $N_p$ and $N_{max}$ in proportion to divergence of $\gamma_{max}$ from 1.

$$N_p = N_p (\gamma_{max} = 1)$$

$$N_p = N_p - 2\log(G_{max})/\log(1 - \gamma_{max})$$

$$N_p = N_{max} (N_p - 2\log(G_{max})/\log(1 - \gamma_{max}) > N_{max})$$

For the criteria for changing the above set value, the amplitude of the nuclear instrumentation signals S is important. The amplitude of the nuclear instrumentation signals S is automatically calculated upon execution of peak detection. The standard deviations that represent signal variations may also be used as the criteria for changing the setting.

A standard deviation contains noise components other than an oscillation component, and the noise component strength of these background noise components depends on a plant and the operating state of the plant.

FIG. 10 shows distributions of standard deviations of nuclear instrumentation signals at different four operating points in the same plant.

The distributions are roughly divided into three groups. The distribution in FIG. 10A has small amplitude and variations, while in FIG. 10B the amplitude is relatively large and the variations are expanded. In two operating states in FIGS. 10C and 10D, the amplitude and the variations are almost the same, though the amplitude is larger than that in FIGS. 10A and 10B, and the variations are also expanded.

Figure 10A:
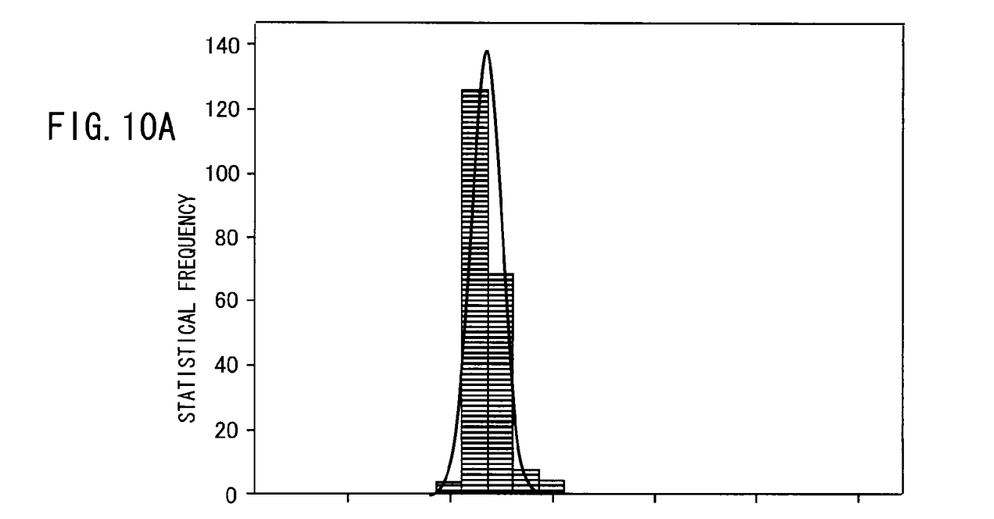
FIGS. 10A to 10D are graph views showing frequency distributions of standard deviations of nuclear instrumentation signals at different four operating points in the same plant.
Figure 10B:
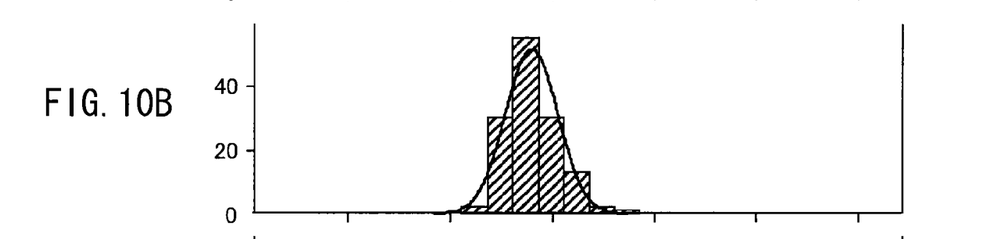
Figure 10C:
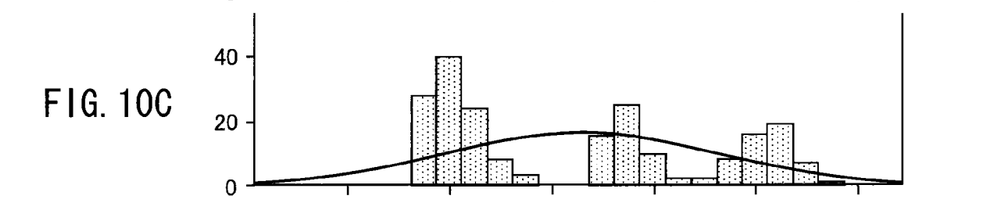
Figure 10D:
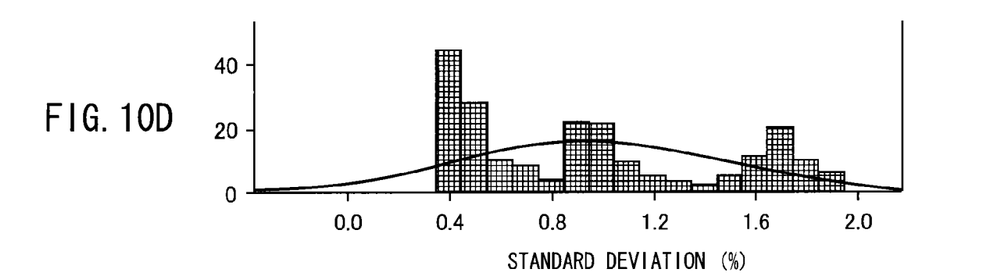

A ratio between output power and flow rate at the operating points gradually increases from FIG. 10A toward FIG. 10D. It can be estimated that the nuclear thermal hydraulic stability is also gradually deteriorated in this order. However, since power oscillations have not occurred in the example of FIG. 10, it is possible in this case to avoid erroneous detection of power oscillations other than nuclear thermal hydraulic power oscillations with high probability even with the amplitude of 2% being set as a criterion for determining occurrence of power oscillations.

In the states close to the normal operation state shown in FIGS. 10A and 10B, an average value of standard deviations is about 0.5 to 0.7, and this value is considered to be equivalent to a background noise level. Therefore, if this value is set as $S_{min}$ and the aforementioned 2% is set as $S_{max}$, then $G_{max}$ equals to about 3.0 to 4.0.

FIG. 11 shows an example in which nuclear instrumentation system signals are gradually destabilized and result in power oscillations. In FIG. 11, the transition of fractional standard deviations of the signals is divided into six stages.

Figure 11A:
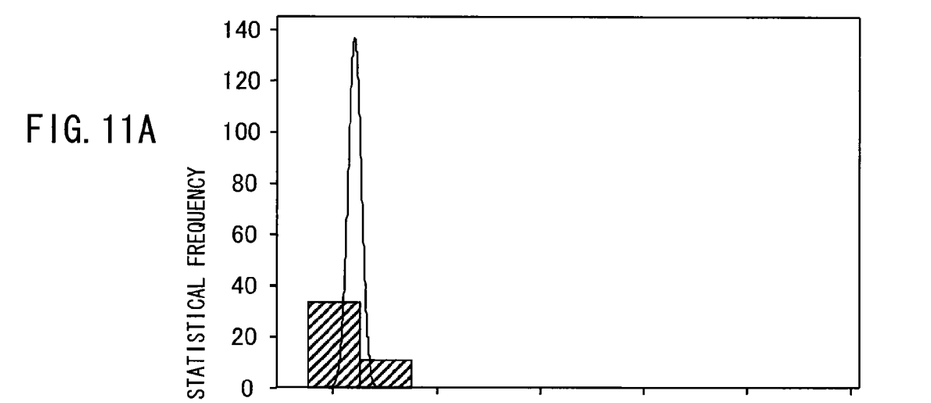
FIGS. 11A to 11F are graph views showing frequency distributions of standard deviations of nuclear instrumentation signals which are gradually destabilized and end up in power oscillations.
Figure 11B:
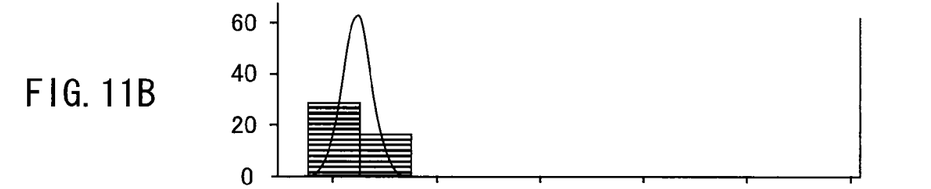
Figure 11C:
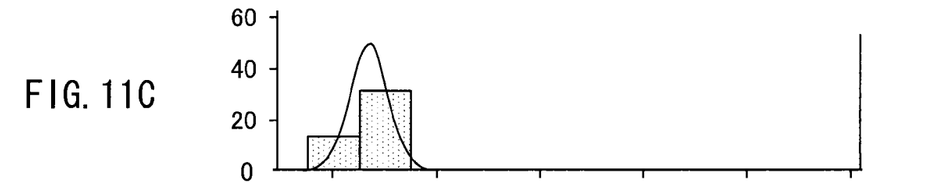
Figure 11D:
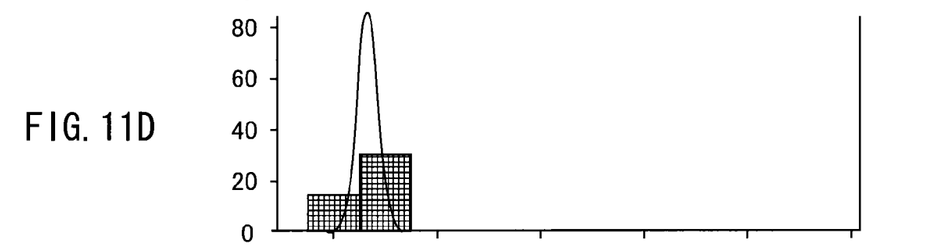
Figure 11E:
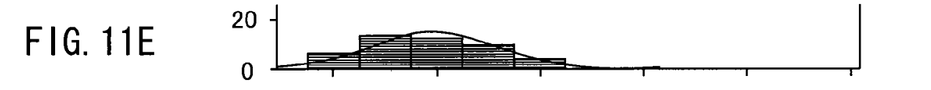
Figure 11F:
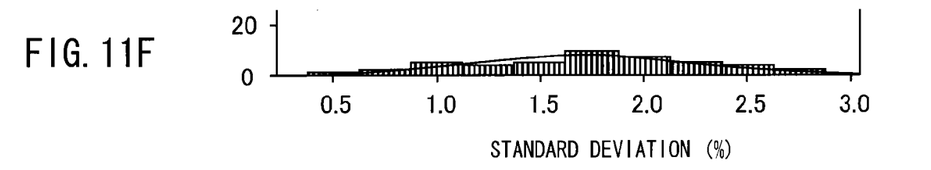

It is considered that the reactor core is gradually destabilized from FIG. 11A toward FIG. 11F. Since the reactor core is considered to be in a destabilized state at the stage of shifting from FIG. 11E to FIG. 11F, it can be said that $S_{max}$ is appropriately set at 2% based on the distribution of FIG. 11E. Since the background noise level in the normal operation state of this plant is considered to be smaller than that in FIG. 11A, $S_{min}$ takes a value of about 0.6.

Therefore, $G_{max}$ is about 3.3, which is almost comparable to that in the example of FIG. 10.

Figure 12:
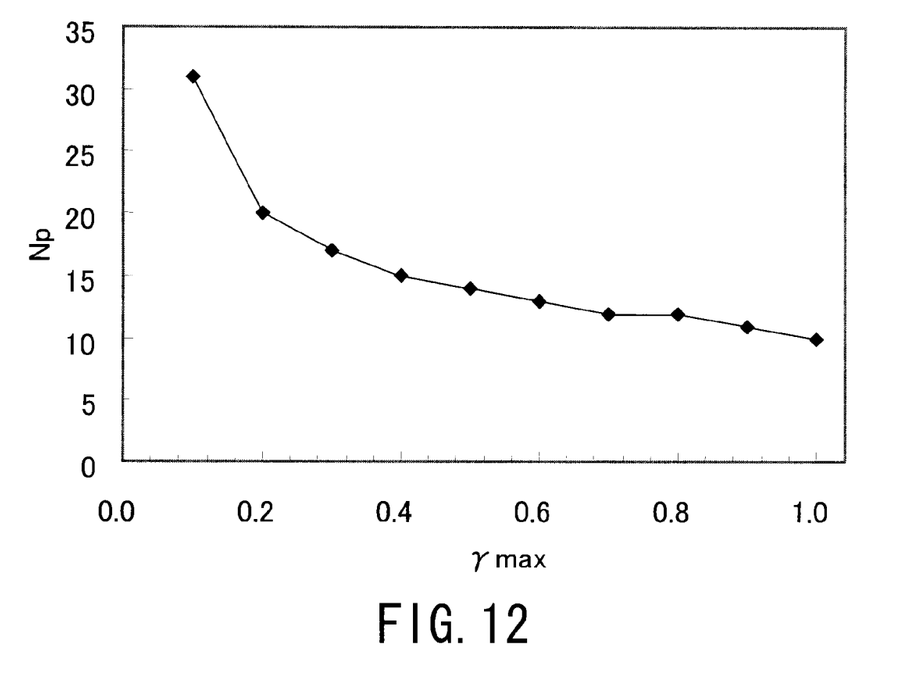
FIG. 12 is a graph view showing a trip determination frequency $N_p$ updated with respect to a maximum decay ratio $\gamma_{max}$ estimated with a stability analysis code.

FIG. 12 shows a trip determination frequency $N_p$ updated with respect to a maximum decay ratio $\gamma_{max}$ which is estimated by the stability analysis code on the premise that an initial value of the trip determination frequency (limit value D) is 10.

When the maximum decay ratio is 0.4, the trip determination frequency is 15, which is 1.5 times larger than the initial value. When the maximum decay ratio is 0.2, the trip determination frequency is doubled. In the core state estimated to clearly and sufficiently be stable, erroneous detection is avoidable by setting a severe trip determination criterion (limit value D).

It is also possible to set a determination frequency, as a criterion for determining occurrence of power oscillations, in consideration of a detection delay of the nuclear instrumentation detectors, an activation delay in power oscillation suppression operation, a delay until power oscillation suppression operation becomes effective, and a delay in cooling characteristics improvement.

While the aforementioned delays depend on specifications of hardware, operating states and the like, they are not so large a value, typically in the range of about 2 to 4 seconds. These delays are taken into consideration based on a ratio between an oscillation period derived from the physical models and an oscillation period derived from the nuclear instrumentation signals S.

More specifically, when a time delay is set as TD and an oscillation period (which is an inverse of the frequency estimated by the stability analysis code or which can be estimated by the peak detection function of instrumentation signals) is set as TP, a correction frequency NC is equal to a ratio of TD/TP. Therefore, NC=TD/TP (fraction rounded up) may be subtracted from the updated trip determination frequency $N_p$. Since the oscillation period is also about 2 to 3 seconds, a delay correction frequency is a value of about 1 to 2.

As is clear from FIGS. 10 and 11, an average value of the amplitude of a plurality of nuclear instrumentation signals increases and the distribution thereof is more expanded as the nuclear thermal hydraulic stability becomes poorer. Therefore, it becomes possible to use this characteristic for monitoring the nuclear thermal hydraulic stability.

Figure 13:
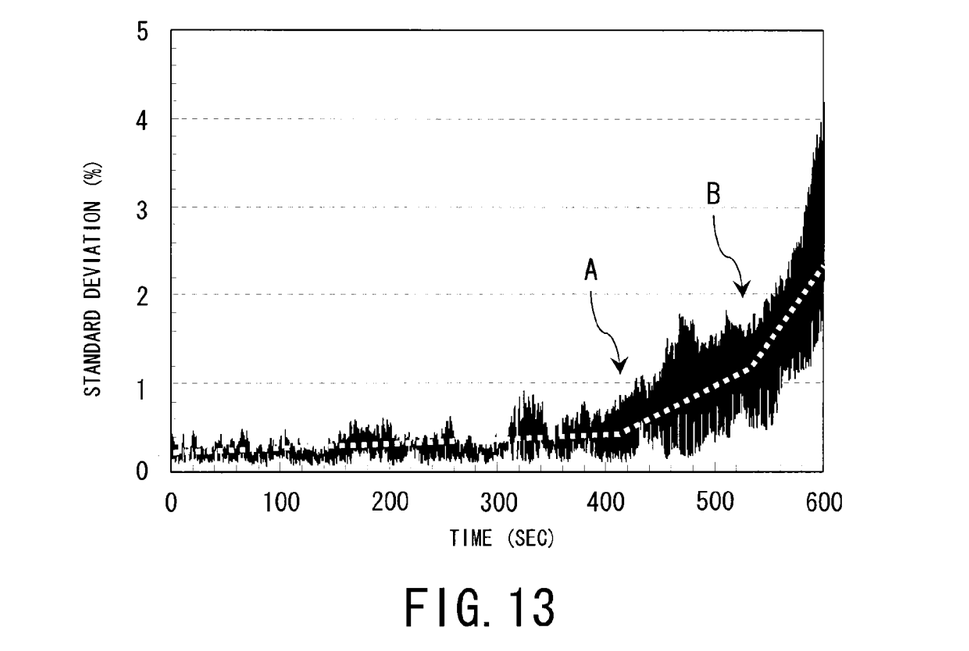
FIG. 13 is a graph view showing fluctuation of standard deviation in all the nuclear instrumentation signals response due to destabilization.

FIG. 13 shows fluctuation of standard deviation in all the nuclear instrumentation response signals due to destabilization.

Although the standard deviation values gradually increase in connection with destabilization, it is indicated that the increasing rate demonstrates nonsequential change. In short, it is indicated that the increasing rate grows nonsequetially at an arrow A portion and an arrow B portion in FIG. 13.

It can be considered that these portions demonstrate an indication that the nuclear thermal hydraulic stability is significantly deteriorated. That is, around these two portions, the inclination nonsequetially increases about 10 times and 5 times, respectively.

Actually, the decay ratio also nonsequetially increases in the vicinity of arrow A portion in FIG. 13. In the area around this point, destabilization starts to be notable. Accordingly, the point can be used as a timing to strengthen the stability monitoring level, i.e., to loosen the criterion for determining power oscillations.

In the vicinity of arrow B portion, the core is in the state where power oscillations are likely to grow after this point. Accordingly, power oscillation suppression operation is activated at this point.

According to at least one of the embodiments disclosed, it becomes possible to provide a technology for monitoring nuclear thermal hydraulic stability of a nuclear reactor with enhanced monitoring accuracy and reliability.

Although some embodiments of the present invention were described, these embodiments are in all respects illustrative and are not considered as the basis for restrictive interpretation. It should be understood that these embodiments can be performed in other various forms and various removals, replacements and modifications are possible without departing from the meaning of the present invention. These embodiments and their modifications are intended to be embraced in the range and meaning of the present invention, and particularly are intended to be embraced in the invention disclosed in the range of the claims and the equivalency thereof.

What is claimed is:

1. An apparatus for monitoring nuclear thermal hydraulic stability of a nuclear reactor, comprising:
    a calculation unit configured to calculate a stability index of a nuclear thermal hydraulic phenomenon based on nuclear instrumentation signals, the signals being outputted by a plurality of nuclear instrumentation detectors placed at regular intervals in a reactor core;
    a simulation unit configured to simulate the nuclear thermal hydraulic phenomenon based on a physical model by using information on an operating state of the nuclear reactor as an input condition;
    a limit value updating unit configured to update a limit value of the nuclear thermal hydraulic phenomenon based on a result of the simulation; and
    a determination unit configured to determine, based on the stability index and the limit value, whether or not to activate a power oscillation suppressing device.

2. The apparatus for monitoring nuclear thermal hydraulic stability of the nuclear reactor according to claim 1, wherein at least one model is employed as the physical model from among:

a three-dimensional reactor core simulator that simulates a three-dimensional distribution of the nuclear thermal hydraulic phenomenon inside the reactor core;
a plant heat balance model that simulates heat balance of a plant;
a plant transition analysis code that simulates a transient characteristic of the plant; and
a stability analysis code that analyzes stability of the nuclear thermal hydraulic phenomenon in an arbitrary operating state based on results of these simulations,
the apparatus further comprising:
a data interface unit configured to transmit the input condition and data between the respective codes; and
a man machine interface unit configured to display or output an analysis result based on an instruction from an operator.

3. The apparatus for monitoring nuclear thermal hydraulic stability of the nuclear reactor according to claim 1, wherein determination based on the stability index and the limit value is performed for at least one object among:
a core stability decay ratio;
a regional stability decay ratio;
a decay ratio of the nuclear instrumentation signal that is representative of those grouped by characteristics of fuel assemblies placed in the reactor core;
a decay ratio of the nuclear instrumentation signal that reflects a thermal hydraulic phenomenon of a most thermally severe fuel assembly; and
natural frequencies of these nuclear instrumentation signals.

4. The apparatus for monitoring nuclear thermal hydraulic stability of the nuclear reactor according to claim 1, wherein the stability index is calculated by extracting a frequency component corresponding to power oscillations from the nuclear instrumentation signal.

5. The apparatus for monitoring nuclear thermal hydraulic stability of the nuclear reactor according to claim 4, wherein when a maximum amplitude that is observed or that may possibly be observed in a stage prior to shift from a stable state to an unstable state is regarded as an oscillation determination amplitude, and an average value of standard deviations of the nuclear instrumentation signals during normal operation is regarded as a background noise amplitude in the determination unit, an allowable growth rate of the amplitude defined as a ratio of the background noise amplitude to the oscillation determination amplitude is employed as a determination criterion.

6. The apparatus for monitoring nuclear thermal hydraulic stability of the nuclear reactor according to claim 4, wherein a criterion for determining occurrence of the power oscillations is set in consideration of a detection delay of the nuclear instrumentation detector, an activation delay of power oscillation suppression operation, and a delay until the power oscillation suppression operation becomes effective.

7. The apparatus for monitoring nuclear thermal hydraulic stability of the nuclear reactor according to claim 6, wherein the delays are taken into consideration based on a ratio between an oscillation period derived from the physical model and an oscillation period derived from the nuclear instrumentation signals.

8. The apparatus for monitoring nuclear thermal hydraulic stability of the nuclear reactor according to claim 1, wherein the determination unit performs determination in consideration of a result of evaluating uncertainty of the simulation result and a result of evaluating uncertainty at an operating point where stability evaluation is performed.

9. The apparatus for monitoring nuclear thermal hydraulic stability of the nuclear reactor according to claim 8, wherein the determination is performed with the evaluation result estimated conservatively.

10. The apparatus for monitoring nuclear thermal hydraulic stability of the nuclear reactor according to claim 1, wherein
a standard deviation that indicates a variation of each nuclear instrumentation signal is calculated, a standard deviation and an average value of a plurality of nuclear instrumentation signals are calculated based on the calculated standard deviation of each nuclear instrumentation signal, and the determination unit is operated based on increasing rates of these calculated results.

11. A method for monitoring nuclear thermal hydraulic stability of a nuclear reactor, comprising the steps of:
calculating a stability index of a nuclear thermal hydraulic phenomenon based on nuclear instrumentation signals, the signals being outputted by a plurality of nuclear instrumentation detectors placed at regular intervals in a reactor core;
simulating the nuclear thermal hydraulic phenomenon based on a physical model by using information on an operating state of the reactor as an input condition;
updating a limit value of the nuclear thermal hydraulic phenomenon based on a result of the simulation; and
determining, based on the stability index and the limit value, whether or not to activate a power oscillation suppressing device.

12. A program for monitoring nuclear thermal hydraulic stability of a reactor to be executed by a computer that performs functions of:
calculating a stability index of a nuclear thermal hydraulic phenomenon based on nuclear instrumentation signals, the signals being outputted by a plurality of nuclear instrumentation detectors placed at regular intervals in a reactor core;
simulating the nuclear thermal hydraulic phenomenon based on a physical model by using information on an operating state of the reactor as an input condition;
updating a limit value of the nuclear thermal hydraulic phenomenon based on a result of the simulation; and
determining, based on the stability index and the limit value, whether or not to activate a power oscillation suppressing device.

* * * * *